(12) United States Patent  
Liu et al.

(10) Patent No.: US 12,150,121 B2  
(45) Date of Patent: Nov. 19, 2024

(54) METHOD AND APPARATUS FOR RESOURCE SCHEDULING

(71) Applicant: Telefonaktiebolaget LM Ericsson (publ), Stockholm (SE)

(72) Inventors: Chunhui Liu, Beijing (CN); Yuanchun Xie, Beijing (CN); Liang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 403 days.

(21) Appl. No.: 17/628,279

(22) PCT Filed: Jul. 24, 2019

(86) PCT No.: PCT/CN2019/097464  
§ 371 (c)(1),  
(2) Date: Jan. 19, 2022

(87) PCT Pub. No.: WO2021/012208  
PCT Pub. Date: Jan. 28, 2021

(65) Prior Publication Data  
US 2022/0279550 A1    Sep. 1, 2022

(51) Int. Cl.  
*H04W 72/1268* (2023.01)  
*H04W 72/0453* (2023.01)  
(Continued)

(52) U.S. Cl.  
CPC ... *H04W 72/1268* (2013.01); *H04W 72/0453* (2013.01); *H04W 72/1215* (2013.01); *H04W 72/542* (2023.01)

(58) Field of Classification Search  
CPC ......... H04W 72/1268; H04W 72/0453; H04W 72/1215; H04W 72/542  
See application file for complete search history.

(56) References Cited

U.S. PATENT DOCUMENTS 5,933,768 A * 8/1999 Skold .................. H04L 25/0204  
455/296  
7,830,796 B2    11/2010 Chen et al.  
(Continued)

FOREIGN PATENT DOCUMENTS

CN        101502007 A      8/2009  
CN        102769487 A      11/2012  
(Continued)

OTHER PUBLICATIONS

Zeeshan, et al., "Digital Cancellation of Passive Intermodulation in FDD Transceivers," Asilomar Conference on Signals, Systems, and Computers, Oct. 28, 2018, IEEE, pp. 1375-1381.  
(Continued)

*Primary Examiner* — Michael A Keller  
(74) *Attorney, Agent, or Firm* — Sonoda & Kobayashi Intellectual Property Law; Sarvajit S. Patil

(57) ABSTRACT

Embodiments of the present disclosure provide methods and apparatuses for resource scheduling. A method at a base station comprises determining a passive interference cancellation capability of a User Equipment (UE) having a passive interference issue. The passive interference is coupled into a receive path of the UE from a transmission of at least one signal through a transmit path of the UE. The method further comprises scheduling at least one uplink resource for the UE based on the passive interference cancellation capability.

18 Claims, 11 Drawing Sheets

(51) Int. Cl.
*H04W 72/12* (2023.01)
*H04W 72/542* (2023.01)

(56) References Cited

U.S. PATENT DOCUMENTS

| | | | |
|---|---|---|---|
| 9,231,801 B2 | 1/2016 | Rimini et al. | |
| 9,942,881 B2* | 4/2018 | Sahlin | H04W 72/23 |
| 10,141,961 B1 | 11/2018 | Huang et al. | |
| 2010/0309874 A1* | 12/2010 | Sahara | H04L 1/1607 370/329 |
| 2011/0075558 A1 | 3/2011 | Isaksson et al. | |
| 2012/0295558 A1 | 11/2012 | Wang et al. | |
| 2013/0044621 A1* | 2/2013 | Jung | H04J 11/005 370/336 |
| 2015/0334612 A1* | 11/2015 | Ray Chaudhuri | H04W 16/10 455/437 |
| 2017/0141886 A1 | 5/2017 | Chung et al. | |
| 2018/0048347 A1 | 2/2018 | Kim et al. | |

FOREIGN PATENT DOCUMENTS

| | | | | |
|---|---|---|---|---|
| CN | 105162568 A | | 12/2015 | |
| GB | 2499259 A | * | 8/2013 | ............ H04B 1/525 |
| WO | 2016059424 A1 | | 4/2016 | |

OTHER PUBLICATIONS

Extended European Search Report for European Patent Application No. 19938987.5, mailed Mar. 22, 2023, 11 pages.

Feng, Da-Zheng, et al., "Total Least Mean Squares Algorithm," IEEE Transactions on Signal Processing, vol. 46, Issue 8, Aug. 1998, pp. 2122-2130.

Khatri, Himanshu, et al., "Simulation of Intermodulation Distortion in Passive CMOS FET Mixers," International Microwave Symposium, 2009, IEEE, pp. 1593-1596.

International Search Report and Written Opinion for International Patent Application No. PCT/CN2019/097464, mailed Apr. 7, 2020, 10 pages.

* cited by examiner

300

302

Determining a passive interference cancellation capability of a user equipment (UE) having a passive interference issue, wherein the passive interference is coupled into a receive path of the UE from a transmission of at least one signal through a transmit path of the UE

304

Scheduling at least one uplink resource for the UE based on the passive interference cancellation capability

FIG. 3a

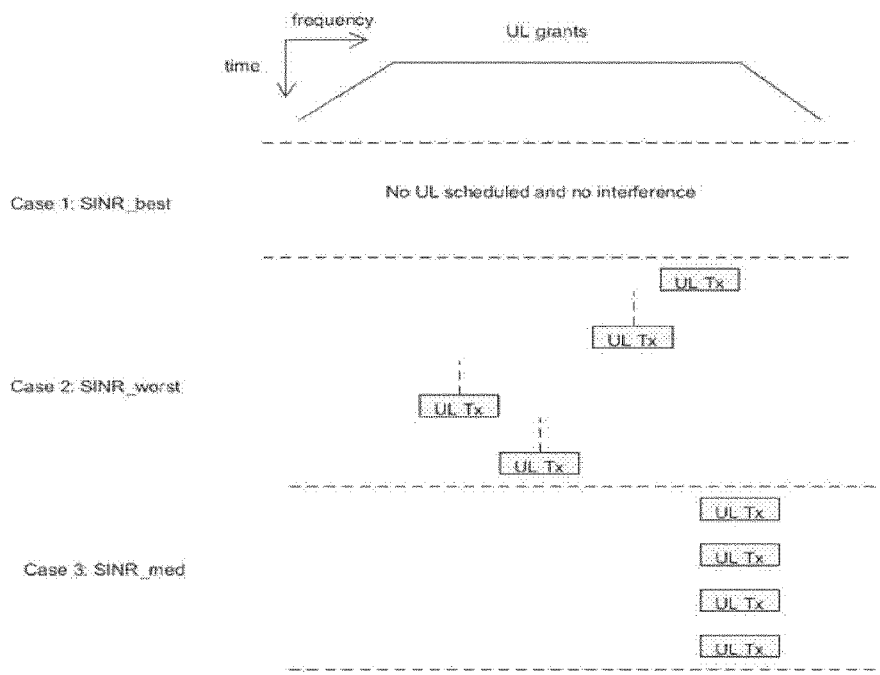

FIG. 3b

METHOD AND APPARATUS FOR RESOURCE SCHEDULING

This application is a 35 U.S.C. § 371 national phase filing of International Application No. PCT/CN2019/097464, filed Jul. 24, 2019, the disclosure of which is incorporated herein by reference in its entirety.

TECHNICAL FIELD

The non-limiting and exemplary embodiments of the present disclosure generally relate to the technical field of communications, and specifically to method and apparatus for resource scheduling.

BACKGROUND

This section introduces aspects that may facilitate a better understanding of the disclosure. Accordingly, the statements of this section are to be read in this light and are not to be understood as admissions about what is in the prior art or what is not in the prior art.

Non-linearity and/or time variance in a radio system can result in passive interference. For example, the passive interference may be generated in a radio device when one or more signals are transmitted along a signal path including a component having a non-linear transmission characteristic. The passive interference may potentially cause interference to one or more other signals in some paths such as a receive signal of the radio device. The passive interference is becoming a problem in wireless communication systems such as cellular wireless systems. For example, in the wireless communication system supporting LTE (long term evolution) and NR (new radio), at a user equipment (UE) side, the passive interference such as passive inter-modulation (PIM) may occur when LTE UL (uplink) and NR DL (downlink) are scheduled at the same time. Many existing works such as US20120295558A1, U.S. Pat. No. 9,231,801, WO2016059424A1 and U.S. Ser. No. 10/141,961 propose different methods to mitigate the passive interference such as PIM.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

FIG. 1 shows a schematic diagram of passive interference cancellation at a UE. As shown in FIG. 1, the passive interference may exist when LTE UL signal transmission and NR DL signal reception occur at the same time. Since UE is aware of its LTE UL signals, the UE can estimate the passive interference coupled into the NR DL signal by using a trained interference estimator. The UE can removes the estimated interference from its received NR DL signal. In this way, the passive interference can be suppressed.

In some passive interference cancellation solutions such as passive inter-modulation cancellation (PIMC), UE needs to train an interference estimator to ensure a residual error is insignificant. However, the training of the interference estimator takes time. For example, an algorithm LMS (least mean squares), which is proposed by Feng, Da Zheng, Z. Bao, and L. C. Jiao, "Total least mean squares algorithm", IEEE Transactions on Signal Processing 46.8 (1998):2122- 2130, employs step search to derive the best coefficients for the interference estimator. The larger the searching step is, the more frequent LMS misses its convergence. Alternatively, the smaller the searching step is, the slower the convergence of LMS becomes.

On the other hand, those coefficients for the interference estimator may vary due to the time variance of the radio system. Thus, it is favorable for the UE with passive interference cancellation such as PIMC that the passive interference may be stable for a sufficiently long period. Then, a set of converged coefficients for the interference estimator can be valid for as many resources (such as subframes and/or slots and/or physical resource block (PRB) numbers and/or PRB positions) as possible. The interference estimator can track time variation of the radio systems and then the passive interference cancellation such as PIMC may be more effective. Otherwise, UE should train its interference estimator over and over again. Then, the trained interference estimator after convergence may be effective for a short time. The efficiency of the passive interference cancellation such as PIMC may be lowered significantly.

To overcome or mitigate at least one of the above mentioned problems or other problems or provide a useful solution, embodiments of the present disclosure propose a resource scheduling solution. Some embodiments provide a solution for a base station to identify UEs which can perform the passive interference cancellation such as PIMC. Some embodiments provide a solution for a base station to schedule at least one uplink resource for the UE to let a trained interference estimator of the UE be effective for a predefined period such as a long period. Some embodiments provide a solution for a base station to accumulate UL (uplink) data of the UE to ensure the UE can be consistently scheduled for consecutive resource such as slots and/or subframes and/or PRB numbers and/or PRB positions.

In a first aspect of the disclosure, there is provided a method at a base station. The method comprises determining a passive interference cancellation capability of a user equipment (UE) having a passive interference issue. The passive interference is coupled into a receive path of the UE from a transmission of at least one signal through a transmit path of the UE. The method further comprises scheduling at least one uplink resource for the UE based on the passive interference cancellation capability.

In an embodiment, the passive interference issue of the UE is determined by the base station based on a downlink quality comparison in a passive interference scenario and a non-passive interference scenario.

In an embodiment, determining the passive interference cancellation capability of the UE comprises assigning multiple same or similar uplink resources to the UE to make the passive interference stable; and determining the passive interference cancellation capability of the UE based on a downlink quality.

In an embodiment, determining that the passive interference cancellation is supported by the UE when the downlink quality is improved; or determining that the passive interference cancellation is not supported by the UE when the downlink quality is not improved.

In an embodiment, scheduling at least one uplink resource for the UE based on the passive interference cancellation capability is performed when the UE is operating in frequency bands which can generate the passive interference or when the UE is operating in frequency bands which can generate the passive interference and has at least one service requiring high uplink traffic.

In an embodiment, the at least one service requiring high uplink traffic includes at least one of a video communication service and a file upload service.

In an embodiment, when the passive interference cancellation capability indicates that the passive interference cancellation is supported by the UE, scheduling at least one uplink resource for the UE based on the passive interference cancellation capability comprises scheduling at least one uplink resource for the UE such that a passive interference estimator trained for the UE is effective for a predefined period.

In an embodiment, scheduling at least one uplink resource for the UE such that a passive interference estimator trained for the UE is effective for a predefined period comprises: removing all existing scheduling constrains for the UE for avoiding the passive interference; and consecutively assigning same or similar uplink resources to the UE to make the passive interference stable.

In an embodiment, scheduling at least one uplink resource for the UE such that a passive interference estimator trained for the UE is effective for a predefined period further comprises adjusting an uplink data rate of the UE for services insensitive to time by using rate shaping.

In an embodiment, the passive interference includes at least one of passive inter-modulation interference and harmonic interference.

In an embodiment, the at least one uplink resource includes at least one physical resource block number and/or physical resource block position.

In a second aspect of the disclosure, there is provided a method at a user equipment (UE) having a passive interference issue. The method comprises receiving scheduling information of at least one uplink resource from a base station. The at least one uplink resource is determined based on a passive interference cancellation capability of the UE. The method further comprises transmitting uplink data based on the scheduling information.

In an embodiment, the scheduling information is received by the UE when the UE is operating in frequency bands which can generate the passive interference or when the UE is operating in frequency bands which can generate the passive interference and has at least one service requiring high uplink traffic.

In an embodiment, the at least one service requiring high uplink traffic includes at least one of a video communication service and a file upload service.

In an embodiment, a transmission on the scheduled at least one uplink resource causes a passive interference estimator trained for the UE to be effective for a predefined period.

In an embodiment, the at least one uplink resource is consecutively assigned same or similar uplink resource.

In an embodiment, the method according to the second aspect of the disclosure the further comprises training a passive interference estimator; and cancelling the passive interference by using the passive interference estimator.

In an embodiment, the passive interference includes at least one of passive inter-modulation interference and harmonic interference.

In an embodiment, the at least one uplink resource includes at least one physical resource block number and/or physical resource block position.

In another aspect of the disclosure, there is provided an apparatus at a base station. The apparatus comprises a processor; and a memory coupled to the processor, said memory containing instructions executable by said processor, whereby said apparatus is operative to determine a passive interference cancellation capability of a user equipment (UE) having a passive interference issue. The passive interference is coupled into a receive path of the UE from a transmission of at least one signal through a transmit path of the UE. Said apparatus is further operative to schedule at least one uplink resource for the UE based on the passive interference cancellation capability.

In another aspect of the disclosure, there is provided an apparatus at a user equipment (UE) having a passive interference issue. The apparatus comprises a processor; and a memory coupled to the processor, said memory containing instructions executable by said processor, whereby said apparatus is operative to receive scheduling information of at least one uplink resource from a base station. The at least one uplink resource is determined based on a passive interference cancellation capability of the UE. Said apparatus is further operative to transmit uplink data based on the scheduling information.

In another aspect of the disclosure, there is provided a base station. The base station comprises a determining module and a scheduling module. The determining module is configured to determine a passive interference cancellation capability of a user equipment (UE) having a passive interference issue. The passive interference is coupled into a receive path of the UE from a transmission of at least one signal through a transmit path of the UE. The scheduling module is configured to schedule at least one uplink resource for the UE based on the passive interference cancellation capability.

In another aspect of the disclosure, there is provided a user equipment. The user equipment comprises a receiving module and a transmitting module. The receiving module is configured to receive scheduling information of at least one uplink resource from a base station. The at least one uplink resource is determined based on a passive interference cancellation capability of the UE. The transmitting module is configured to transmit uplink data based on the scheduling information.

In another aspect of the disclosure, there is provided a computer program product, comprising instructions which, when executed on at least one processor, cause the at least one processor to carry out the method according to any of the above first to second aspects.

In another aspect of the disclosure, there is provided a computer-readable storage medium storing instructions which when executed by at least one processor, cause the at least one processor to carry out the method according to any of the above first to second aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station is to carry out the method according to the first aspect.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to carry out the method according to the first aspect.

According to a another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device is configured to carry out the method according to the second aspect.

According to another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device is configured to carry out the method according to the second aspect.

According to another of the disclosure, there is provided a method implemented in a communication system including a host computer, a base station and a terminal device. The method comprises, at the host computer, receiving user data transmitted to the base station from the terminal device. The terminal device is configured to carry out the method according to the second aspect.

According to another aspect of the disclosure, there is provided a communication system including a host computer comprising a communication interface configured to receive user data originating from a transmission from a terminal device to a base station. The terminal device comprises a radio interface and processing circuitry. The processing circuitry of the terminal device is configured to carry out the method according to the second aspect.

According to another aspect of the disclosure, there is provided a method implemented in a communication system including a host computer, a base station and a terminal device. The method comprises, at the host computer, receiving, from the base station, user data originating from a transmission which the base station has received from the terminal device. The base station is configured to carry out the method according to the first aspect.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry is configured to carry out the method according to the first aspect.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3a shows a flowchart of a method according to an embodiment of the present disclosure;

FIG. 3b and FIG. 3c show schematic diagrams of how to determine the passive interference cancellation capability of the UE according to an embodiment;

DETAILED DESCRIPTION

Figure 1:
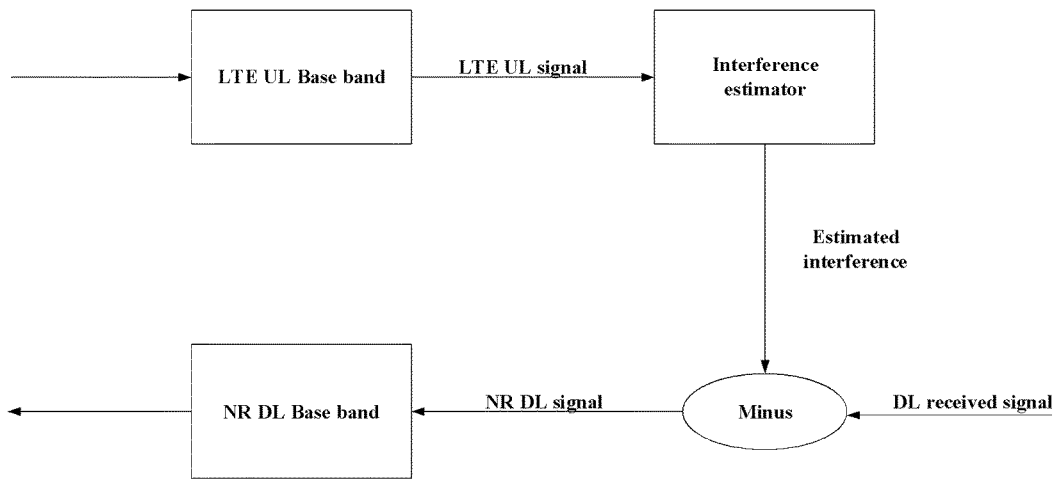
FIG. 1 shows a schematic diagram of passive interference cancellation at a UE.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as the first generation (1G), 2G, 2.5G, 2.75G, 3G, 4G, 4.5G, 5G communication protocols, and/or any other communication standards either currently known or to be developed in the future. In the following description, the terms "network" and "system" can be used interchangeably. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

The term "base station" refers to an access network device in a communication network via which a terminal device accesses to the network and receives services therefrom. For example, the base station (BS) may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards for example promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device such as base station to a terminal device, and an uplink, UL, transmission refers to a transmission in an opposite direction.

Figure 2:
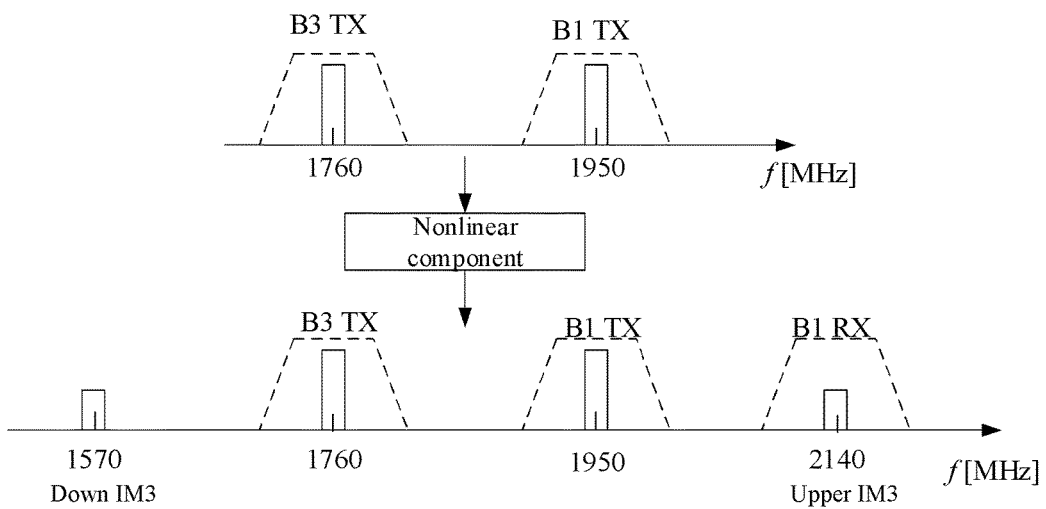
FIG. 2 schematically shows a spectral illustration of PIM.

As used herein, passive intermodulation (PIM) may be generated due to various reasons, for example, passive components of a radio frequency (RF) transceiver front-end, such as duplexer, diplexer, multiplexer or antenna selection switches, etc. Moreover, the PIM may leak directly into the receiver and may lead to receiver desensitization. FIG. 2 schematically shows a spectral illustration of PIM. As shown in FIG. 2, there are two uplink transmissions (TX) at band 1 (1920-1980 MHz) and band 3 (1710-1780 MHz) for example in an inter-band carrier aggregation (CA) scenario. The upper third-order intermodulation sub-band (M3) falls within for example downlink reception (RX) at band 1, reflecting thus a self-interference problem due to PIM. It is noted that there may be any other suitable bands which can experience similar problems. There may be more than two uplink transmissions at the same band or different bands which can cause PIM. The bands used for the downlink may be below or above the bands used for the uplink.

As used herein, harmonic interference may be generated due to various reasons, for example, non-linear characteristics in a transmitter, etc. The harmonics are fundamental frequency multiples. If a harmonic signal falls within a pass band of a nearby receiver and the harmonic signal level is of sufficient amplitude, it can degrade the performance of the receiver.

It is noted that the terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments are mainly described in the context of passive inter-modulation interference and harmonic interference, they are not limited to this but can be applied to any suitable passive interference.

FIG. 3 shows a flowchart of a method according to an embodiment of the present disclosure, which may be performed by an apparatus implemented in or at or communicatively coupled to a base station or any other entity having similar functionality. As such, the base station may provide means for accomplishing various parts of the method 300 as well as means for accomplishing other processes in conjunction with other components.

At block 302, the base station determines a passive interference cancellation capability of a UE having a passive interference issue. The passive interference may be coupled into a receive path of the UE from a transmission of at least one signal through a transmit path of the UE. The passive interference may include at least one of passive inter-modulation (PIM) interference and harmonic interference. For example, the passive interference may include only the passive inter-modulation interference or only the harmonic interference or both the passive inter-modulation interference and the harmonic interference. In other embodiments, the passive interference may be any other suitable interference which can be coupled into the receive path of the UE from the transmission of at least one signal through a transmit path of the UE.

The base station may know that the UE has the passive interference issue in various ways. In an embodiment, the UE may report its passive interference issue to the base station for example in various signaling messages. In another embodiment, the base station may retrieve the UE's passive interference issue from another network device containing user subscription information for example HLR (Home Location Register) or HSS(Home Subscriber Server) or UDM (Unified Data Management), etc.

In still another embodiment, the base station may determine that the UE has the passive interference issue by using historical data related to the UE. For example, when the historical data related to the UE indicates that the UE has the passive interference issue at a specific condition such as a specific time and/or a specific location and/or using a specific service, then when the UE fulfills this specific condition, the base station may determine that the UE has the passive interference issue.

In still another embodiment, the base station may determine that the UE has the passive interference issue by using a specific definition. The specific definition may be related to any scenario that the UE has the passive interference issue. The specific definition may be configured by the operator or generated by using machine learning for example on historical data related to UEs. For example, when the UE is located in a defined scenario, then the base station may determine that the UE has the passive interference issue.

In still another embodiment, the base station may determine that the UE has the passive interference issue based on a downlink quality comparison in a passive interference scenario and a non-passive interference scenario. For example, the base station may identify a scenario that the UE may have the passive interference issue according to operating bands of the UE. The base station may then determine that the UE has the passive interference issue based on the downlink quality comparison in the passive interference scenario and the non-passive interference scenario. For example the base station may collect at least one downlink channel quality report from the UE in the non-passive interference scenario (e.g., without passive interference or the generated passive interference will not interfere the received signal of the UE for example when the generated passive interference signal does not fall within a pass band of a receiver the UE). The downlink channel quality report may carry information on how good/bad the downlink channel quality is. For example, the downlink channel quality report may be at least one of CQI (Channel Quality Indicator), reference signal received power (RSRP), and reference signal received quality (RSRQ), and signal-to-interference-plus-noise ratio (SINR) measured based on a downlink signal. In the non-passive interference scenario, the base station should ensure that the UL and DL of the UE are not scheduled at the same time or the passive interference will not cause interference to the DL of the UE when the UL and DL of the UE are scheduled at the same time. In the passive interference scenario, the base station may periodically assign UL of one slot/subframe with different PRB numbers and PRB positions, which can result interference such as PIM to the DL of the UE. The definition of PRB may be different for example depending on the specific radio system. For example, the definition of PRB may be similar to the PRB as defined in LTE or NR. According to feedback (such as HARQ (Hybrid automatic repeat request)) and/or the downlink channel quality report (such as CQI, RSRP, SINR, RSRQ, etc.), the base station can compare the downlink quality in the passive interference scenario with the one in the non-passive interference scenario. If the downlink quality in the passive interference scenario does not drop or drop by no more than a predefined threshold when comparing with the downlink quality in the non-passive interference scenario, the base station may determine that the UE has no passive interference issue. The determination that the UE has no passive interference issue may be due to various reasons, for example, non-linear issue of the component (such as radio frequency (RF) component) of the UE is not so serious and/or the UE suffers a serious DL interference that the passive interference will not be significant (for example, CQI only presents SINR level, not absolute value of interference) and/or the UE uses some special hardware design (for example hardware design to separate 2 UL RF branches), etc. Otherwise, the base station may determine that the UE has the passive interference issue.

In an embodiment, the base station may determine whether the UE has the passive interference issue multiple times in order to get accurate information on whether the UE has the passive interference issue. For example, the base station may determine whether the UE has the passive interference issue when there is not serious DL interference to the UE, for example, when the load of the network and/or the base station is at a low level. In addition, after getting this information, the base station may store it in its local storage or another network device such as HLR and/or HSS and/or UDM for future use. For example, the information on whether the UE has the passive interference issue may be stored in HLR and/or HSS and/or UDM and can be retrieved by one or more base station or other network device.

The base station may determine the passive interference cancellation capability of the UE having a passive interference issue in various ways. In an embodiment, the UE may report its passive interference cancellation capability to the base station in various signaling messages. In another embodiment, the base station may retrieve the UE's passive interference cancellation capability from a storage device such as the local storage for example when the UE's passive interference cancellation capability has been stored in the local storage, or another network device containing user subscription information for example HLR or HSS or UDM, etc. for example when the user subscription information may contain information of UE's passive interference cancellation capability.

In still another embodiment, the base station may determine the passive interference cancellation capability of the UE having the passive interference issue by using historical data related to the UE. For example, when the historical data related to the UE indicates the passive interference cancellation capability of the UE having the passive interference issue, then the base station may determine the passive interference cancellation capability of the UE having the passive interference issue from the historical data.

In still another embodiment, the base station may determine the passive interference cancellation capability of the UE by assigning multiple same or similar uplink resources to the UE to make the passive interference stable and determining the passive interference cancellation capability of the UE based on a downlink quality. For example, the base station may assign consecutive UL grants with the same or similar PRB numbers and PRB positions. The base station may determine the downlink quality of the UE from the downlink channel quality report (such as CQI, RSRP, SINR, RSRQ, etc.). In an embodiment, the base station may determine that the passive interference cancellation is supported by the UE when the downlink quality is improved or improved by no less than a predefined threshold. Otherwise, the base station may determine the passive interference cancellation is not supported by the UE. For example, if the base station determine that the downlink quality is improved or improved by no less than the predefined threshold, the base station may identify that a passive interference cancellation method (such as SW (software) based passive interference cancellation method) is applied to mitigate the passive interference.

In an embodiment, the base station may obtain DL link quality without passive interference, DL link quality with unstable passive interference and DL link quality with stable passive interference. By comparing these DL link qualities, if the convergence exists, the base station may observe it and then identify the application of SW based method to mitigate the passive interference.

Figure 3C:
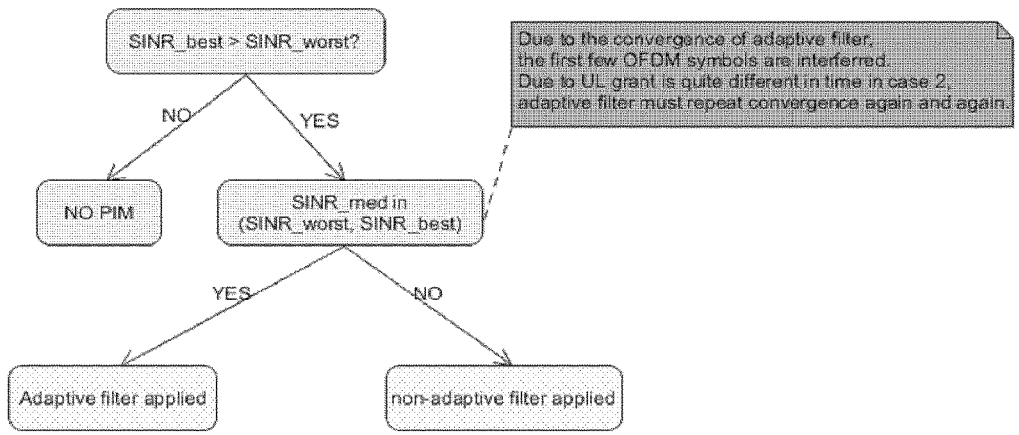

FIG. 3b and FIG. 3c shows schematic diagrams of how to determine the passive interference cancellation capability of the UE according to an embodiment. As shown in FIG. 3b, there are three cases 1, 2 and 3. Case 1 corresponds to a scenario where no UL resource is scheduled to the UE and thus there is no passive interference in the UE and the SINR of the UE (SINR_best) may be the best. Case 2 corresponds to a scenario where UL grant is quite different in time and thus the SINR of the UE (SINR_worst) may be the worst. Case 3 corresponds to a scenario where UL grant is same in time and thus the SINR of the UE (SINR med) may be medium. As shown in FIG. 3c, the base station may compare SINR_best and SINR_worst. If the SINR_best is greater than SINR_worst, the base station may determine whether SINR med is in a range of (SINR_worst, SINR_best). Otherwise, the base station may determine that there is no passive interference. If SINR med is in the range of (SINR_worst, SINR_best), the base station may determine that an adaptive filter is applied. Otherwise the base station may determine that no-adaptive filter is applied. Due to the convergence of the adaptive filter, the first few symbols (such as OFDM (Orthogonal Frequency Division Multiplexing) symbols) may be interfered. Due to UL grant is quite different in case 2, the adaptive filter may need to repeat convergence again and again. In this embodiment, the adaptive filter is used to cancel the passive interference.

In an embodiment, the base station may determine the passive interference cancellation capability of the UE multiple times in order to get the accurate passive interference cancellation capability of the UE. For example, the base station may determine the passive interference cancellation capability of the UE when there is not serious DL interference to the UE, for example, when the load of the network and/or the base station is at a low level. After knowing the passive interference cancellation capability of the UE, the base station may store it in its local storage or another network device such as HLR and/or HSS and/or UDM for future use for example by this base station and/or another base station.

With reference to FIG. 3a, at block 304, the base station schedules at least one uplink resource for the UE based on the passive interference cancellation capability of the UE. The at least one uplink resource may be any suitable resource for example depending on the specific radio system. In an embodiment, the at least one uplink resource may include at least one PRB number and/or PRB position.

In an embodiment, the base station may schedule at least one uplink resource for the UE based on the passive interference cancellation capability when the UE is operating in frequency bands which can generate the passive interference. For example, when the passive interference cancellation capability indicates that the passive interference cancellation is supported by the UE, the base station may schedule at least one uplink resource for the UE based on the passive interference cancellation capability.

In another embodiment, the base station may schedule at least one uplink resource for the UE based on the passive interference cancellation capability when the UE is operating in frequency bands which can generate the passive interference and has at least one service requiring high uplink traffic. For example, when the base station determines the passive interference cancellation capability (such as SW based passive interference cancellation method) of the UE based on the downlink quality as described above and this determination may take a long time, the base station may select UE with UL service requiring high traffic in a long time to schedule at least one uplink resource for the UE based on the passive interference cancellation capability of the UE. The at least one service requiring high uplink traffic may include at least one of a video communication service and a file upload service. There may be any other services requiring high uplink traffic such as data/video/big file upload over TCP (Transmission Control Protocol), etc.

In an embodiment, when the passive interference cancellation capability indicates that the passive interference cancellation is supported by the UE, the base station may schedule at least one uplink resource for the UE such that a passive interference estimator trained for the UE is effective for a predefined period. The predefined period may be determined in various ways such as configured by the operator or determined based on machine learning. In an embodiment, the predefined period may be a long time period. For example, when the UE is identified as supporting the passive interference cancellation capability, the base stations may assign consecutive UL resources to the UE as often as possible.

In an embodiment, the base station may remove all existing scheduling constrains for the UE for avoiding the passive interference and consecutively assign same or similar uplink resources to the UE to make the passive interference stable. For example, when the UE is running into passive interference issues and DL and UL of the UE may occur simultaneously, the base station may remove all existing scheduling constrains for the UE to avoid passive interference, obsolete conventional method for the UE, and consecutively assign the same UL PRBs or similar UL PRBs in time to UE to make passive interference stable.

In an embodiment, the base station may adjust an uplink data rate of the UE for services insensitive to time by using rate shaping. The rate shaping may be any suitable rate shaping for example as described in U.S. Pat. No. 7,830,796 and EP2481255A1. For example, when the UE is running into the passive interference issue and DL and UL of the UE may occur simultaneously, the base station may remove all existing scheduling constrains for the UE to avoid passive interference and obsolete conventional method for the UE. By rate shaping, the base station can adjust UL data rate for the services insensitive to time, and then consecutively assign the same UL PRBs or similar UL PRBs in time to UE to make passive interference stable.

In an embodiment, when the UE's DL reception and UL transmission can be periodically aligned, then the method 300 can be applied as well for some services requiring a certain quality of service such as GBR (Guaranteed Bit Rate) service.

In an embodiment, if the UE requires services with small packages or only one-side communication is required, the above method 300 may be unnecessary to be applied in the base station.

In an embodiment, when the passive interference cancellation capability indicates that the passive interference cancellation is not supported by the UE, the base station may schedule at least one uplink resource for the UE such that a transmission on the scheduled at least one uplink resource does not generate the passive interference or generate the least passive interference. This scheduling can be performed when the UE is operating in frequency bands which can generate the passive interference or when the UE is operating in frequency bands which can generate the passive interference and has at least one service requiring high uplink traffic.

Figure 4:
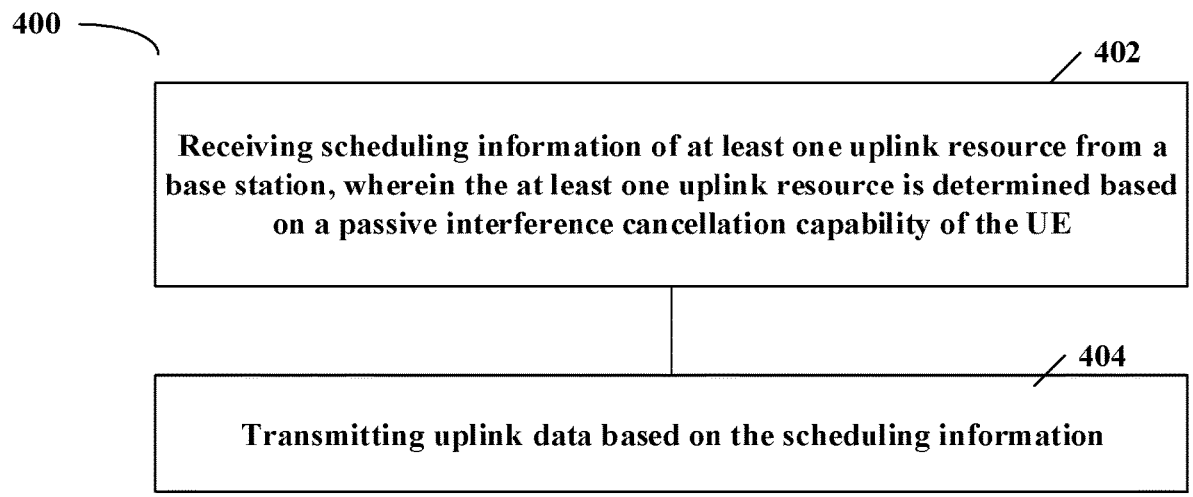
FIG. 4 shows a flowchart of a method according to another embodiment of the present disclosure.

FIG. 4 shows a flowchart of a method according to an embodiment of the present disclosure, which may be performed by an apparatus implemented in or at or communicatively coupled to a UE having a passive interference issue or any other entity having similar functionality. As such, the UE may provide means for accomplishing various parts of the method 400 as well as means for accomplishing other processes in conjunction with other components. For some parts which have been described in the above embodiments, detailed description thereof is omitted here for brevity.

At block 402, the UE receives scheduling information of at least one uplink resource from a base station. The at least one uplink resource may be determined based on a passive interference cancellation capability of the UE. For example, the base station may schedule at least one uplink resource for the UE based on the passive interference cancellation capability of the UE at block 304 of FIG. 3a. Then the UE may receive the scheduling information.

At block 404, the UE transmits uplink data based on the scheduling information.

In an embodiment, the scheduling information may be received by the UE when the UE is operating in frequency bands which can generate the passive interference or when the UE is operating in frequency bands which can generate the passive interference and has at least one service requiring high uplink traffic. For example, as described above, the base station may schedule at least one uplink resource for the UE based on the passive interference cancellation capability when the UE is operating in frequency bands which can generate the passive interference or when the UE is operating in frequency bands which can generate the passive interference and has at least one service requiring high uplink traffic, then the UE can receive the scheduling information.

In an embodiment, the at least one service requiring high uplink traffic includes at least one of a video communication service and a file upload service.

In an embodiment, a transmission on the scheduled at least one uplink resource causes a passive interference estimator trained for the UE to be effective for a predefined period. In an embodiment, the at least one uplink resource is consecutively assigned same or similar uplink resource. For example, the base station may remove all existing scheduling constrains for the UE for avoiding the passive interference and consecutively assign same or similar uplink resources to the UE to make the passive interference stable. In another example, the base station may remove all existing scheduling constrains for the UE for avoiding the passive interference, adjust an uplink data rate of the UE for services insensitive to time by using rate shaping and consecutively assign same or similar uplink resources to the UE to make the passive interference stable. When the UE transmits uplink data based on the scheduling information, the transmission on the scheduled at least one uplink resource can cause a passive interference estimator trained for the UE to be effective for a predefined period.

Figure 5:
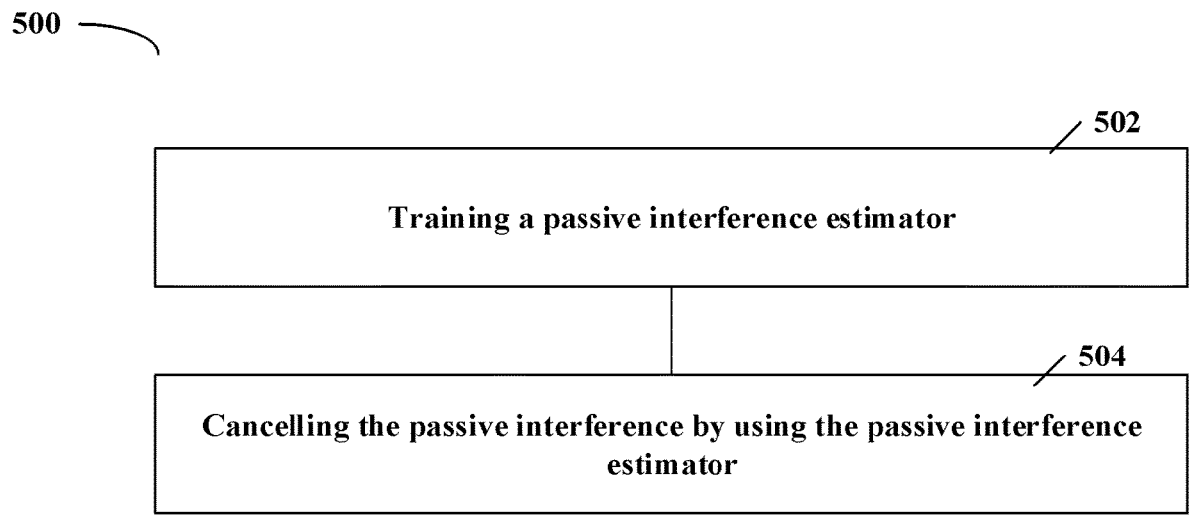
FIG. 5 shows a flowchart of a method according to another embodiment of the present disclosure.

FIG. 5 shows a flowchart of a method according to an embodiment of the present disclosure, which may be performed by an apparatus implemented in or at or communicatively coupled to a UE having a passive interference issue or any other entity having similar functionality. As such, the UE may provide means for accomplishing various parts of the method 500 as well as means for accomplishing other processes in conjunction with other components. For some parts which have been described in the above embodiments, detailed description thereof is omitted here for brevity.

At block 502, the UE trains a passive interference estimator. At block 504, the UE cancels the passive interference by using the passive interference estimator. The passive interference estimator as used in the method 500 may be any suitable passive interference estimator either currently known or to be developed in the future.

Figure 6:
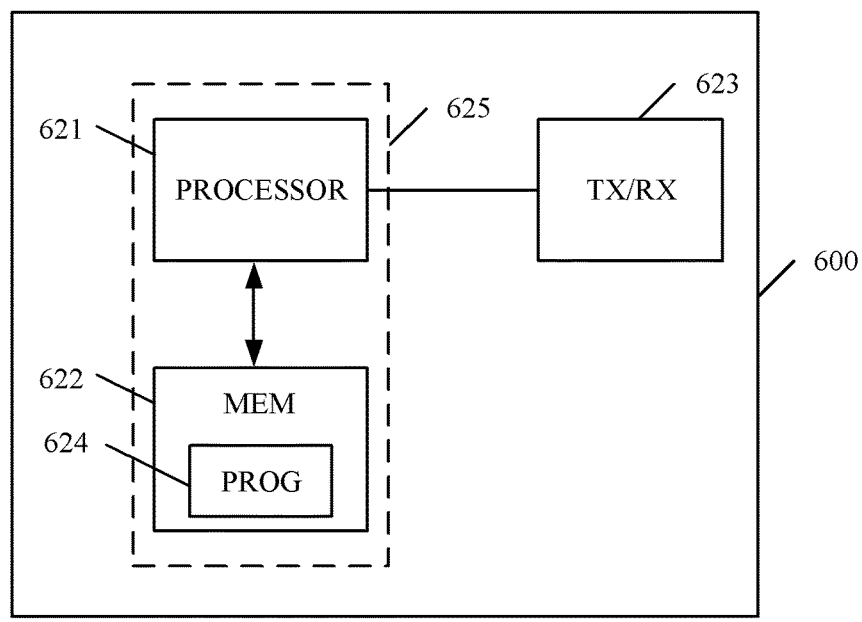
FIG. 6 is a block diagram showing an apparatus suitable for use in practicing some embodiments of the disclosure.

FIG. 6 is a block diagram showing an apparatus 600 suitable for use in practicing some embodiments of the disclosure. For example, any one of the UE and the base station described above may be implemented through the apparatus 600.

The apparatus 600 comprises at least one processor 621, such as a DP, and at least one MEM 622 coupled to the processor 621. The apparatus 620 may further comprise a transmitter TX and receiver RX 623 coupled to the processor 621. The MEM 622 stores a PROG 624. The PROG 624 may include instructions that, when executed on the associated processor 621, enable the apparatus 620 to operate in accordance with the embodiments of the present disclosure. A combination of the at least one processor 621 and the at least one MEM 622 may form processing means 625 adapted to implement various embodiments of the present disclosure.

Various embodiments of the present disclosure may be implemented by computer program executable by one or more of the processor 621, software, firmware, hardware or in a combination thereof.

The MEM 622 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 621 may be of any type suitable to the local technical environment, and may include one or more of general purpose computers, special purpose computers, microprocessors, digital signal processors DSPs and processors based on multicore processor architecture, as non-limiting examples.

Figure 7:
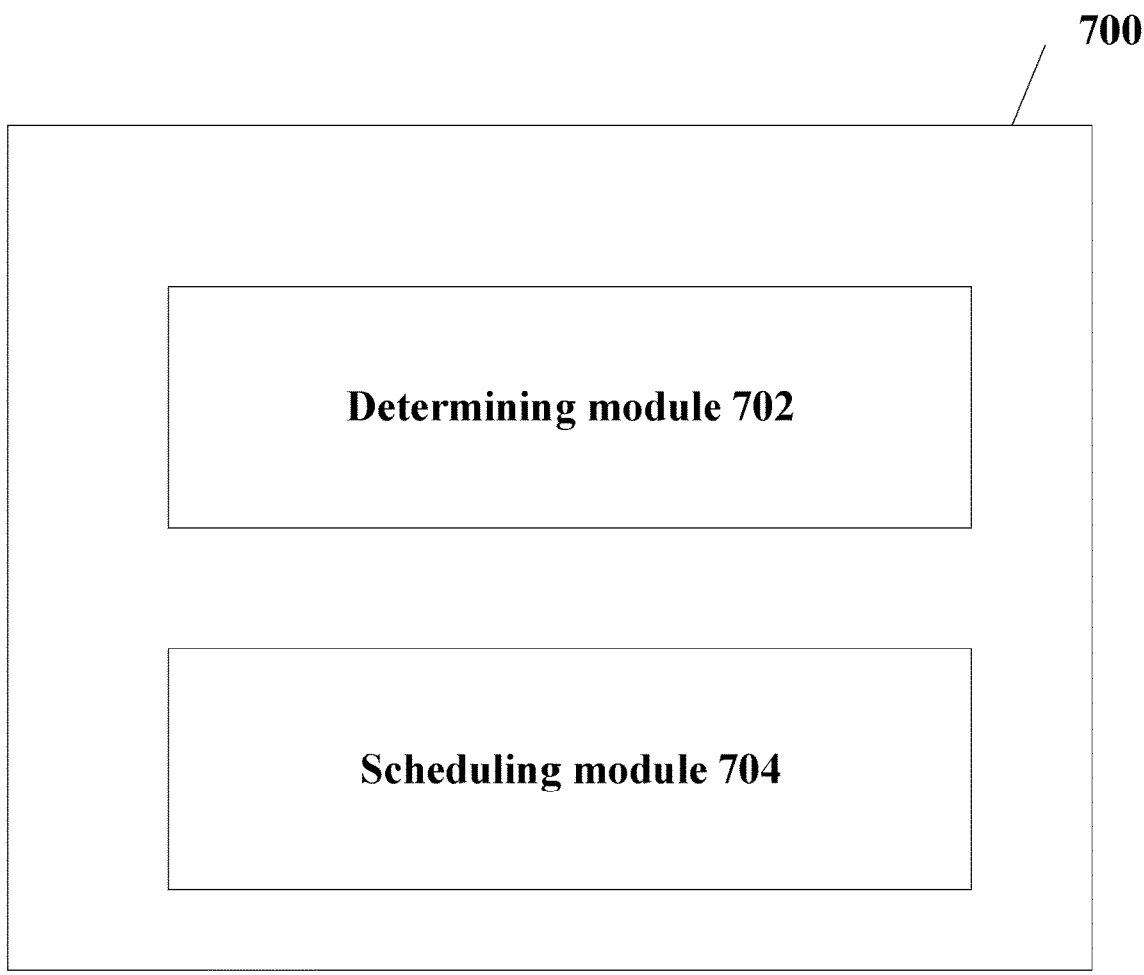
FIG. 7 illustrates a simplified block diagram of apparatus according to an embodiment of the present disclosure.

FIG. 7 is a block diagram showing a base station according to an embodiment of the disclosure. As shown, the base station 700 comprises a determining module 702 and a scheduling module 704. The determining module 702 may be configured to determine a passive interference cancellation capability of a user equipment (UE) having a passive interference issue, wherein the passive interference is coupled into a receive path of the UE from a transmission of at least one signal through a transmit path of the UE, as described above with respect to block 302 of FIG. 3a. The scheduling module 704 may be configured to schedule at least one uplink resource for the UE based on the passive interference cancellation capability, as described above with respect to block 304 of FIG. 3a.

Figure 8:
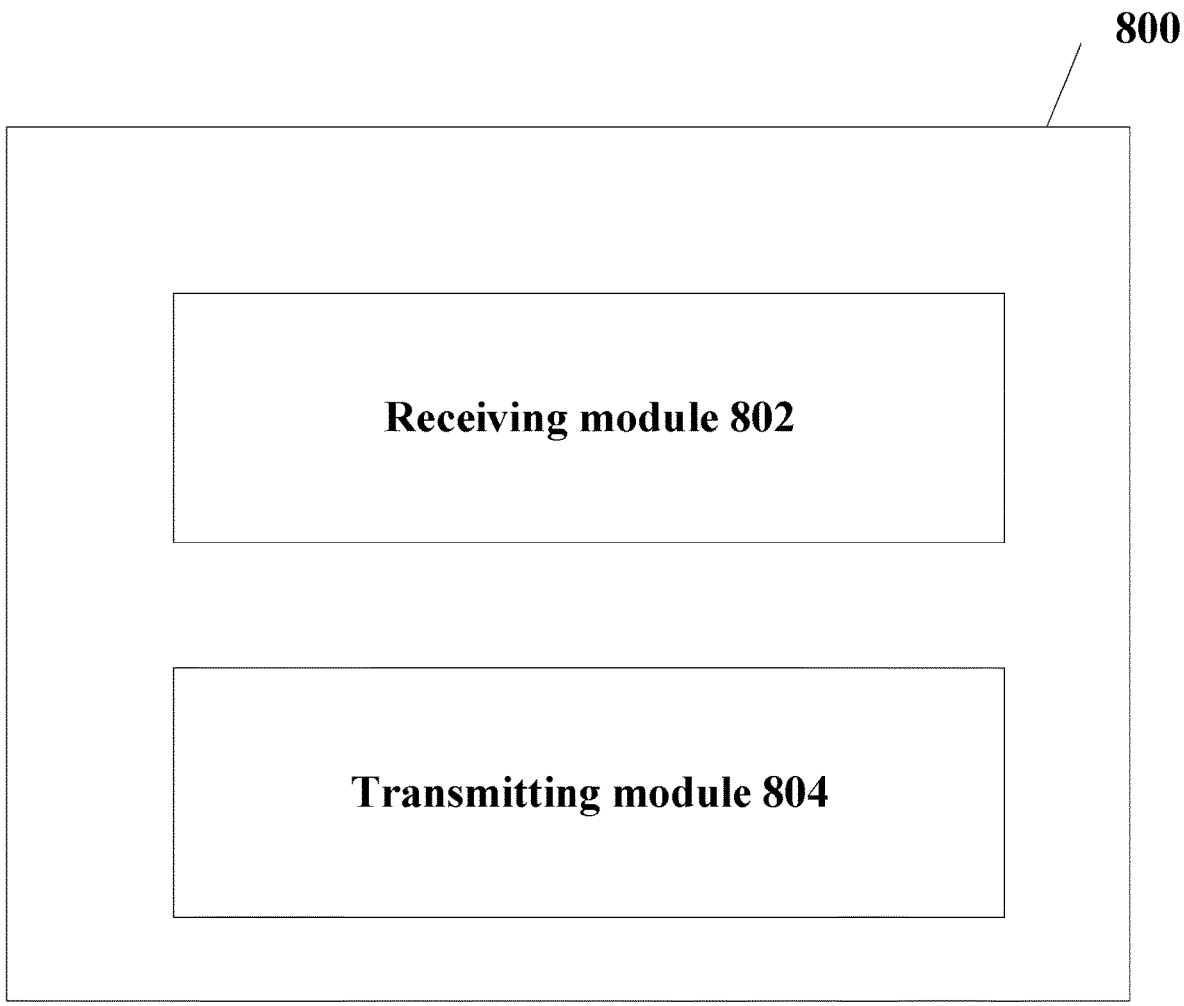
FIG. 8 illustrates a simplified block diagram of apparatus according to another embodiment of the present disclosure.

FIG. 8 is a block diagram showing a UE according to an embodiment of the disclosure. As shown, the UE 800 comprises a receiving module 802 and a transmitting module 804. The receiving module 802 may be configured to receive scheduling information of at least one uplink resource from a base station, wherein the at least one uplink resource is determined based on a passive interference cancellation capability of the UE, as described above with respect to block 402 of FIG. 4. The transmitting module 804 may be configured to transmit uplink data based on the scheduling information, as described above with respect to 404 of FIG. 4.

Figure 9:
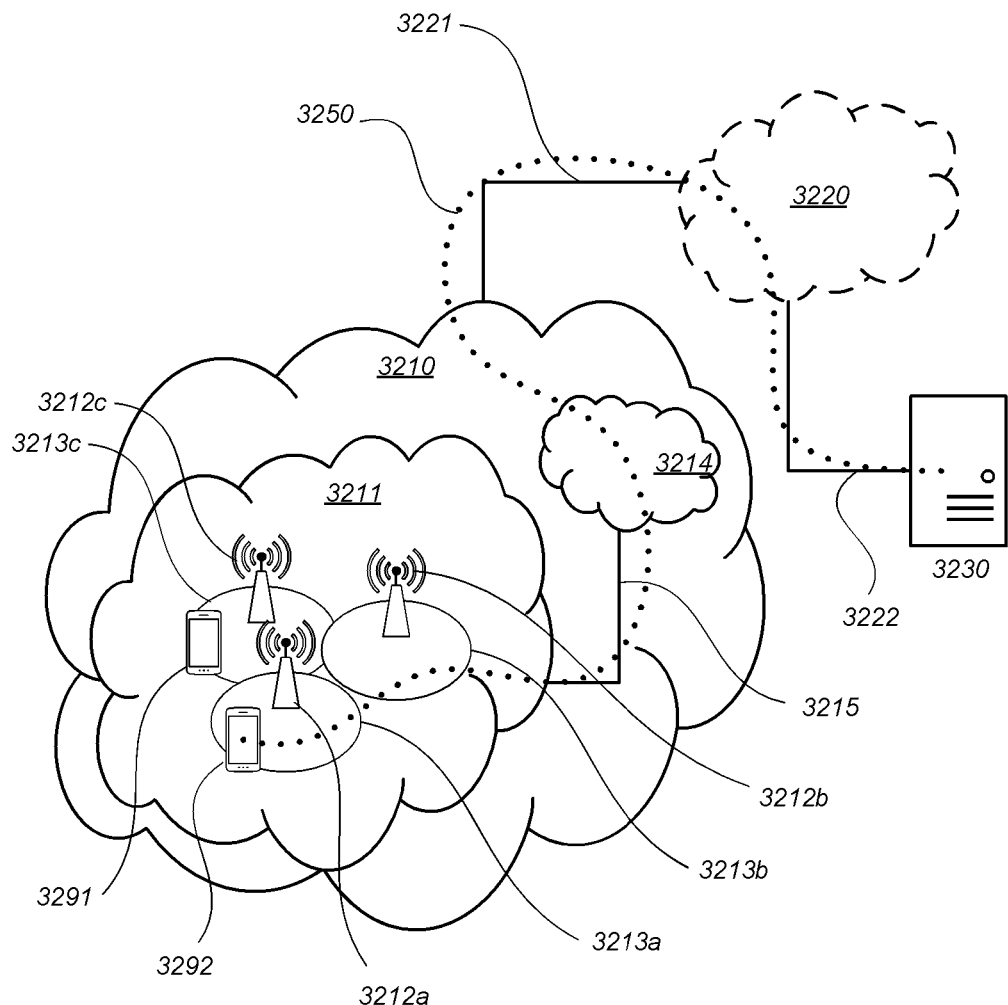
FIG. 9 is a diagram showing a telecommunication network connected via an intermediate network to a host computer in accordance with some embodiments.

With reference to FIG. 9, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 10) served by base station 3320. Communication interface 3326 may be configured to facilitate connection 3360 to host computer 3310. Connection 3360 may be direct or it may pass through a core network (not shown in FIG. 10) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 10:
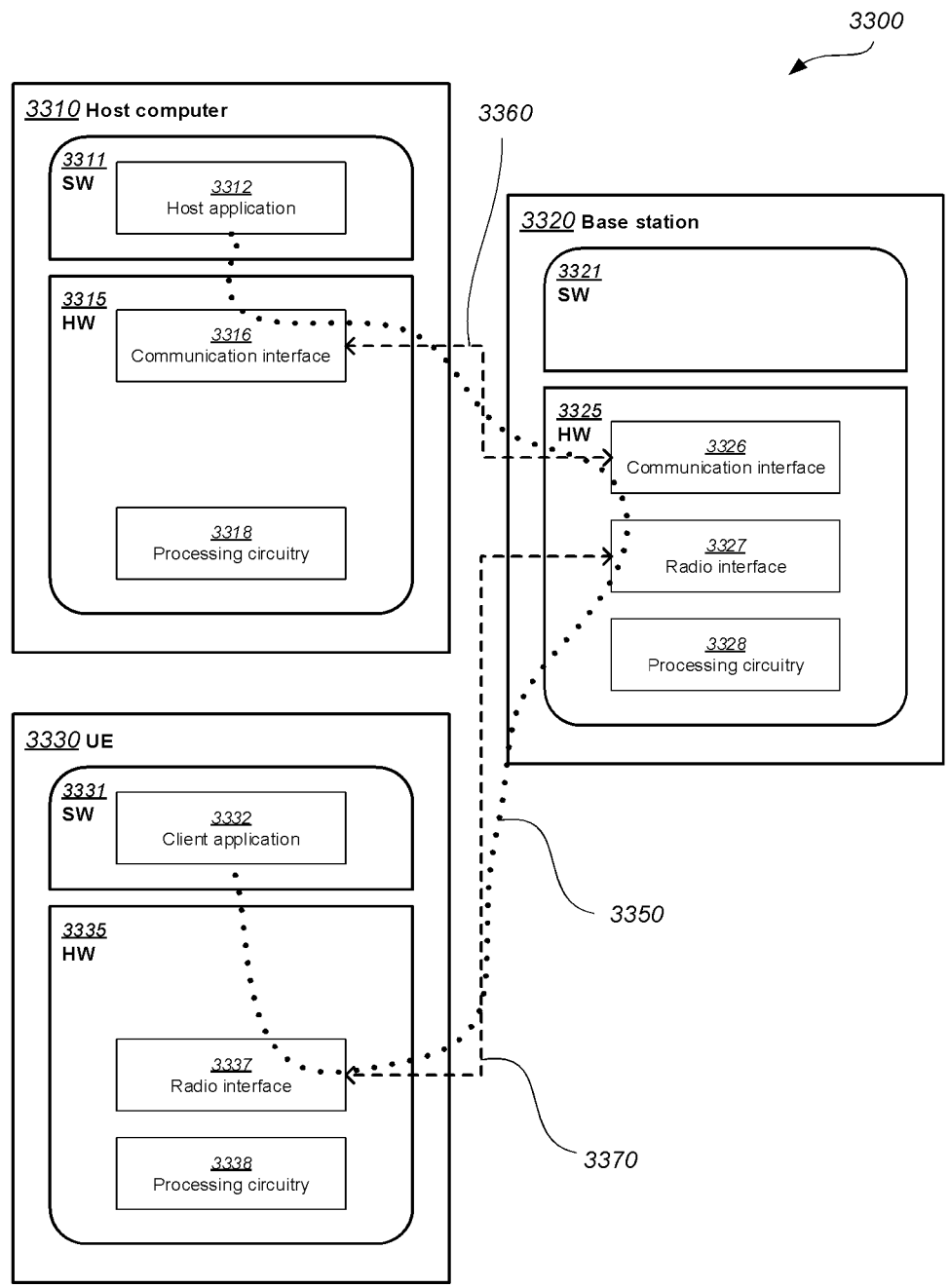
FIG. 10 is a diagram showing a host computer communicating via a base station with a user equipment in accordance with some embodiments.

It is noted that host computer 3310, base station 3320 and UE 3330 illustrated in FIG. 10 may be similar or identical to host computer 3230, one of base stations 3212*a*, 3212*b*, 3212*c* and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 11:
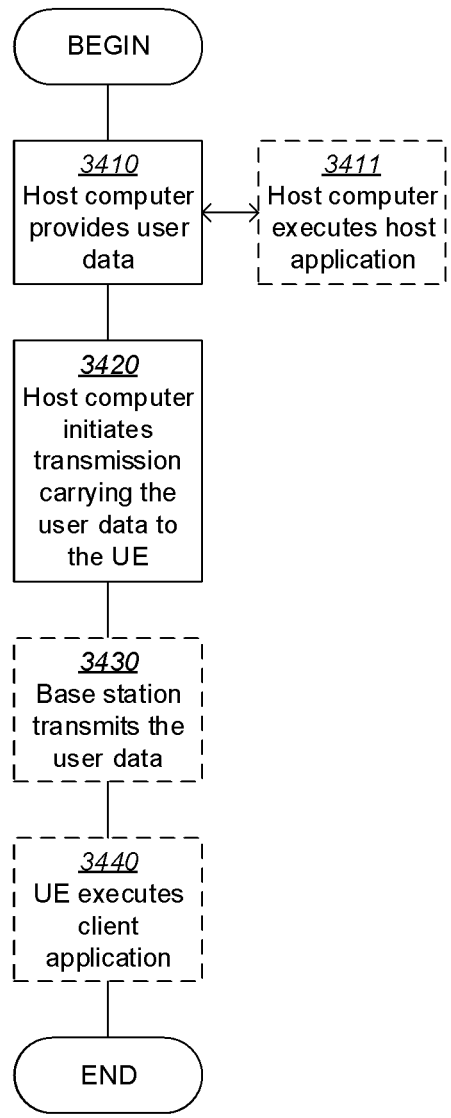
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 12:
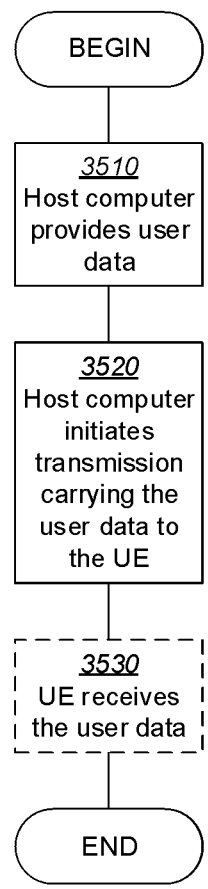
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 13:
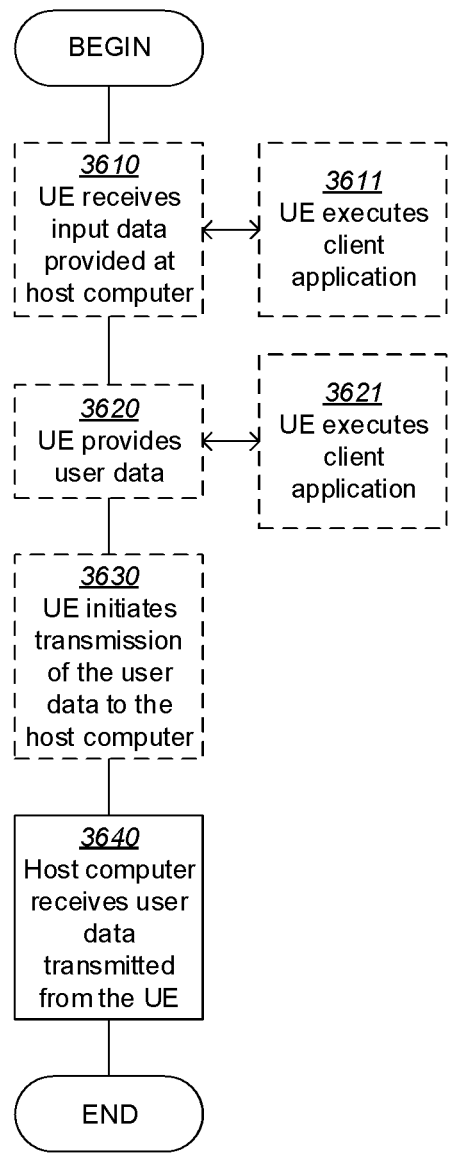
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 14:
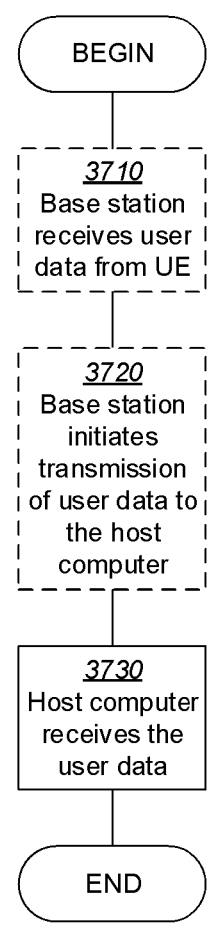
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Many advantages may be achieved by applying the proposed solution according to embodiments of the present disclosure. For example, some embodiments can make passive interference cancellation capability such as PIMC at the UE side more effective. Some embodiments can increase frequency efficiency.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a base station, comprising:
   determining a passive interference cancellation capability of a user equipment (UE) having a passive interference issue, wherein the passive interference is coupled into a receive path of the UE from a transmission of at least one signal through a transmit path of the UE; and
   scheduling at least one uplink resource for the UE based on the passive interference cancellation capability when the UE is operating in frequency bands which can generate the passive interference or when the UE is operating in frequency bands which can generate the passive interference and has at least one service requiring high uplink traffic.

2. The method according to claim 1, wherein the passive interference issue of the UE is determined by the base station based on a downlink quality comparison in a passive interference scenario and a non-passive interference scenario.

3. The method according to claim 1, wherein determining the passive interference cancellation capability of the UE comprises:
   assigning multiple same or similar uplink resources to the UE to make the passive interference stable; and
   determining the passive interference cancellation capability of the UE based on a downlink quality.

4. The method according to claim 3, wherein
   determining that the passive interference cancellation is supported by the UE when the downlink quality is improved; or
   determining that the passive interference cancellation is not supported by the UE when the downlink quality is not improved.

5. The method according to claim 1, wherein the at least one service requiring high uplink traffic includes at least one of a video communication service and a file upload service.

6. The method according to claim 1, wherein when the passive interference cancellation capability indicates that the passive interference cancellation is supported by the UE, scheduling at least one uplink resource for the UE based on the passive interference cancellation capability comprises:
   scheduling at least one uplink resource for the UE such that a passive interference estimator trained for the UE is effective for a predefined period.

7. The method according to claim 6, wherein scheduling at least one uplink resource for the UE such that a passive interference estimator trained for the UE is effective for a predefined period comprises:
   removing all existing scheduling constrains for the UE for avoiding the passive interference; and
   consecutively assigning same or similar uplink resources to the UE to make the passive interference stable.

8. The method according to claim 7, wherein scheduling at least one uplink resource for the UE such that a passive interference estimator trained for the UE is effective for a predefined period further comprises:
   adjusting an uplink data rate of the UE for services insensitive to time by using rate shaping.

9. The method according to claim 1, wherein the passive interference includes at least one of passive inter-modulation interference and harmonic interference.

10. The method according to claim 1, wherein the at least one uplink resource includes at least one physical resource block number and/or physical resource block position.

11. A method at a user equipment (UE) having a passive interference issue, comprising:
    receiving scheduling information of at least one uplink resource from a base station, wherein the at least one uplink resource is determined based on a passive interference cancellation capability of the UE; and
    transmitting uplink data based on the scheduling information,
    wherein the scheduling information is received by the UE when the UE is operating in frequency bands which can generate the passive interference or when the UE is operating in frequency bands which can generate the passive interference and has at least one service requiring high uplink traffic.

12. The method according to claim 11, wherein the at least one service requiring high uplink traffic includes at least one of a video communication service and a file upload service.

13. The method according to claim 11, wherein a transmission on the scheduled at least one uplink resource causes a passive interference estimator trained for the UE to be effective for a predefined period.

14. The method according to claim 11, wherein the at least one uplink resource is consecutively assigned same or similar uplink resource.

15. The method according to claim 11, further comprising:
    training a passive interference estimator; and
    cancelling the passive interference by using the passive interference estimator.

16. The method according to claim 11, wherein the passive interference includes at least one of passive inter-modulation interference and harmonic interference.

17. The method according to claim 11, wherein the at least one uplink resource includes at least one physical resource block number and/or physical resource block position.

18. An apparatus at a base station, comprising:
    a processor; and
    a memory coupled to the processor, said memory containing instructions executable by said processor, whereby said apparatus is operative to:
    determine a passive interference cancellation capability of a user equipment (UE) having a passive interference issue, wherein the passive interference is coupled into a receive path of the UE from a transmission of at least one signal through a transmit path of the UE; and
    schedule at least one uplink resource for the UE based on the passive interference cancellation capability when the UE is operating in frequency bands which can generate the passive interference or when the UE is operating in frequency bands which can generate the passive interference and has at least one service requiring high uplink traffic.

* * * * *